Feb. 5, 1957  E. F. DYSON  2,780,242
RELAY VALVE

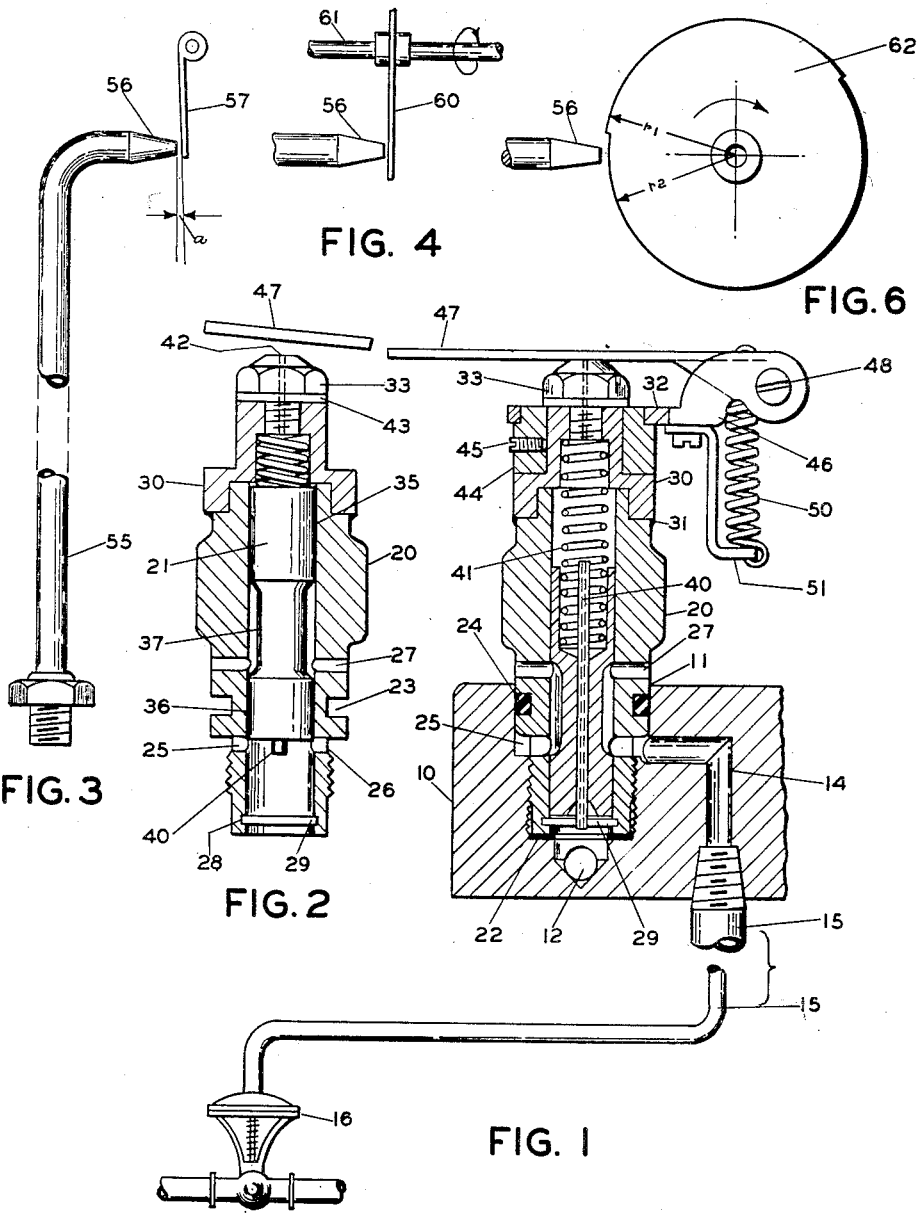

Filed Dec. 11, 1952  2 Sheets-Sheet 2

INVENTOR.
Ernest F. Dyson
BY E. C. Sanborn
Attorney

United States Patent Office 2,780,242
Patented Feb. 5, 1957

2,780,242

RELAY VALVE

Ernest F. Dyson, Meriden, Conn., assignor to The Bristol Company, Waterbury, Conn., a corporation of Connecticut Application December 11, 1952, Serial No. 325,469

15 Claims. (Cl. 137—620)

This invention relates to fluid control apparatus, and more especially to a relay valve whereby relatively great volumes of air or other fluids, such as are required to operate fluid-actuated valves and the like, may be controlled by the expenditure of a very small amount of energy. In the operation, for example, of pneumatically actuated valves, especially of diaphragm types, it is customary to apply to the operating member of such a valve an air pressure of the order of 20 lbs. per square inch to operate the valve in one sense, and to remove said pressure by venting the entrapped air to the atmosphere for operating the valve in the opposite sense. Since it is common for the control of these volumes of air to be effected through the agency of such instruments as process cycle controllers, thermostats, or the like, it becomes desirable that a relay device be interposed between the delicate moving part of the instrument and the pipe or conduit which transmits the working fluid to the controlled valve. The prior art in this field is exemplified in mechanically actuated pilot valves of the class wherein the force required for operating the valve which controls the flow of fluid is derived from the primary actuating element, and therefore, obviously must be of considerable magnitude in order to insure positive action.

It is an object of the present invention to provide a relay valve of the type wherein the valve portion which regulates the controlled fluid derives its actuating force from pressure of fluid in the controlling system.

It is a further object to provide a valve of the foregoing class wherein the primary control may be effected by a negligible expenditure of energy.

It is a further object to provide a valve of the foregoing class which may readily be removed for inspection, repair and replacement.

It is a further object to provide a valve of the foregoing class which shall be rugged in construction and not easily subject to damage or maladjustment.

It is a further object to provide a valve of the foregoing class which shall be readily adaptable to a primary control from a point remote from the location of the valve.

It is a further object to provide a valve of the foregoing class wherein actuation may be effected by any one of a variety of mechanical means as demanded by conditions of the installation.

In carrying out the purposes of the invention it is proposed to provide a control device having cylindrically conformed coacting valve and seat portions wherein the former is in the nature of a piston translating freely within the latter, and being subject to positioning at either of the two extremes of its travel according to the predominating axial pressure thereon. Both ends of the piston are subject to fluid pressure, and upon one end is superimposed the influence of a spring. Means are provided for balancing, or unbalancing, the opposed fluid pressures, so that when said pressures are balanced, the piston, under influence of the spring, is moved to one limit of its excursion, causing the fluid control ports to be combined in one manner, and when fluid pressure is removed from the end of the piston to which the spring is applied, the remaining fluid pressure overcomes the force of the spring alone, causing the piston to be moved to the other extremity of its travel and combine the control ports in another manner. While the invention is hereinafter described in its most common contemplated application, viz. pneumatic control, it will be understood that the principle and structure are fully adaptable to any type of control wherein the flow of a fluid from a source to a specific space or enclosure is directed by more or less obstructing the escape of a relatively small volume of the same fluid from said source.

In the drawings:

Fig. 1 is a side elevation, in section, of a relay valve incorporating the principles of the invention, installed as it would be used in the control of a conventional diaphragm-operated valve, and shown with its movable part in one of its two possible operating positions.

Fig. 2 is a side elevation, partially in section of the relay valve with its movable part in the other of its two possible operating positions.

Fig. 3 illustrates means whereby the relay valve of the invention may be actuated from a point remote from its installed location.

Figs. 4 and 5 are side and end elevations respectively of alternative means whereby the relay valve of the invention may be rendered subject to the position of juxtaposed mechanical parts.

Fig. 6 illustrates a further alternative method of controlling the valve of the invention.

Figure 5:
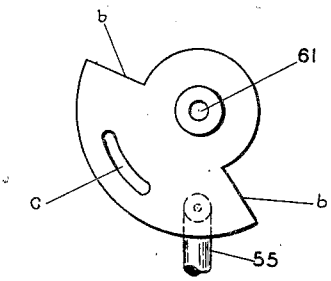

Referring now to the drawings:

In Fig. 1, the numeral 10 designates a manifold or "air-block" adapted for the removable mounting of one or more relay valves, and having formed therein passages for ports whereby connection may be made between interior conduits and the working portions of the valves. A cylindrically bored and tapped opening 11 is adapted to receive, and form sealed connection with, a relay valve embodying the principles of the invention, and hereinafter to be described in detail. The upper, or outer, portion of said opening is bored to a cylindrical conformation, and the lower, or inner, portion of the opening has formed therein a suitable female thread. The lower portion of the opening is extended to form a chamber 12, from which connection is made to a source of pressure fluid supply, not shown in the drawings. Surrounding the opening 12 in the lower part of the opening 11 is formed a flat annular surface to provide sealing with the relay valve when the latter is positioned in the manifold.

Formed within the manifold 10 is an opening 14 laterally entering opening 11 on a diameter between the upper bored portion and the lower threaded portion. To the opening 14, connection is made by means of a pipe or conduit 15 whereby fluid pressure may be transmitted and applied to a diaphragm-operated valve 16 to be controlled. It will be understood that the opening 11 in the manifold 10, together with the pipe or conduit 15, may be duplicated to any desired degree so as to include a plurality of relay valves in a common assembly. The pressure supply chamber 12 may of course be made to connect to all the valve mountings in the manifold.

The valve proper to which the present invention is directed comprises an extended body member 20 having a cylindrical opening axially formed therein and smoothly finished to provide a substantially air-tight fit for a cooperating piston member 21 adapted for axial movement within said opening. One extremity (which may be designated as inner, or lower, end) of the body member 20 is provided with a male thread and a cylindrical part, to cooperate with the threaded and the bored portions respectively of the opening 11 in securing the valve in position within the manifold 10. The lower extremity of the body member 20 is faced to match the annular base portion of the opening 11, therewith to receive in clamping engagement a resilient gasket 22, whereby to seal the pressure supply chamber 12 from the threaded portion of the opening 11. Formed upon the cylindrical part of the body 20 is a circumferential groove 23 adapted to receive a resilient gasket 24 whereby to seal against the passage of air axially from the space 14 to the atmosphere. The gasket 24 is preferably in the nature of an "O-ring"; and for its properties reference may be had to U. S. Letters Patent No. 2,180,795, granted to N. A. Christensen, November 21, 1937.

Formed in the lower part of the body member 20 are two sets of radially drilled openings or ports, a lower set 25 opening into an external circumferential groove 26 and an upper set 27 axially displaced therefrom away from the base of the body member. The groove 26 is so located that when the body 20 is positioned within the manifold 10 said groove will be in substantial alignment with the opening 14, whereby to provide free communication between said opening and the ports 25 whatever the rotated position of the valve body. The upper ports 27 are so located that when said body is positioned within the manifold 10 said ports will open above the upper surface thereof, providing free communication between the interior opening in the body and the surrounding atmosphere. Within, the axial opening in the body portion 20 and near its lower end is interiorly formed a circumferential groove 28 adapted to receive an internal retaining ring 29, the purpose of which will hereinafter be explained.

The medial portion of the body 20 may be of hexagonal conformation to facilitate tightening the valve into its operating position within the manifold 10. The upper, or outer part of the body 20 is provided with a cap 30 coaxially fitted to said body portion and adapted to be permanently and integrally secured thereto, for example, by soldering, as indicated at 31. The upper portion of the cap 30 is externally formed to a reduced diameter to receive a mounting member 32 presently to be described, and is internally threaded to receive a nozzle member 33, also to be described in more detail. (The forming of the body 20 and the cap 30 as separate elements adapted to be permanently incorporated in a single unit is purely a matter of mechanical expediency in production, and has no bearing upon the novelty of the invention. These parts may be integrally formed in a single piece, as indicated in an alternative form subsequently to be described.)

The piston member 21 slidably enclosed in the cylindrical bore within the body member 20 comprises two end portions 35 and 36, toward the nozzle and the base extremities respectively of said body member and having a substantially fluid-tight running fit therein, and an intermediate portion 37 of reduced diameter. The upper and lower limits of excursion of the piston member 21 are established respectively by the interior surface of the cap 30 and by the retaining ring 29, the length of the piston being so proportioned with respect to other elements of the assembly that when it lies in its topmost position, in engagement with the cap 30, its lower extremity will clear the ports 25, providing free communication between said ports and the pressure-fluid chamber 12. The length of the reduced portion 37, and its axial positioning with respect to the piston member 21 of which it forms a part, are made such that when the piston lies at its lowest position with its inner extremity against the retaining ring 29, said reduced portion will span the two sets of ports 25 and 27, thereby placing the former in free communication with the atmosphere, while the enlarged portion 36 of the piston will effectively seal the ports 25 from communication with the chamber 12. An opening in the form of a finely drilled longitudinal hole, or, as shown in the drawings, a section of capillary tubing 40 integrally sealed into the piston member 21 and extending longitudinally therethrough, provides permanent communication between the two ends of the piston whereby pressure fluid may restrictedly flow therethrough. Such a section of capillary tubing has an axial length many times greater than its diameter and inherently provides a greater restricting effect upon fluid flowing therethrough than that provided by an orifice having the same diameter but negligible axial extent. One advantage of such an arrangement results from the fact that the capillary tubing is to a large extent less subject to clogging than an orifice having an equivalent restricting effect since the latter must have a smaller diameter.

The upper portion 35 of the piston member 21 is bored out for a considerable axial distance, giving said portion an annular section; and the lower portion of the cap 30 is similarly bored, thus providing within said piston member and said cap an extended cylindrical space of axial length varying with the position of the piston. Within said space is positioned a compression spring 41 having its extremities abutting respectively upon the bases of the bored portions of the piston and the cap, whereby to exert an influence tending to force said members apart, and thus to maintain the piston member at its lowest, or innermost, position, as indicated in Fig. 1 of the drawings.

The nozzle member 33 is drilled with a small-bore axial orifice 42 whereby to restrict the passage of pressure fluid therethrough, and is provided with a threaded portion whereby to be fitted to the internal thread in the extremity of the cap 30. Between the base of the nozzle member and the extremity of the cap is preferably placed a gasket 43 to prevent leakage around the thread.

The mounting member 32 comprises a collar portion 44 adapted to fit over the reduced section of the cap 30 and be secured thereto as by a set screw 45. Integrally attached to the collar portion 44 is a bracket portion 46 carrying a vane or flapper member 47 pivoted upon said bracket member about a spindle 48 providing an axis perpendicular to that of the valve assembly, and laterally displaced therefrom, whereby, by deflection through a small angle about said axis, said vane or flapper member may be brought into substantial contact with the nozzle 33 to obstruct the orifice 42, as shown in Figure 1, or may be swung away therefrom as indicated in Figure 2, to permit fluid to escape freely to the atmosphere through said orifice. The flapper 47 is normally maintained in engagement with the tip of the nozzle 33 by means of a spring 50 extended from a point on the flapper 47 to an extension 51 of the bracket 46. The spring 50 is made of such strength as to maintain the flapper 47 in contact with the nozzle 33 against the fluid pressure of air within the body of the valve; and, because of the small area of the orifice 42, the force exerted on said flapper is so light that the spring may be made of very small dimensions.

Operation of the device may be described as follows: With the valve assembly in place in the manifold as indicated in Fig. 1, and no fluid pressure applied in the chamber 12, the spring 41 will maintain the piston member in the position shown in Fig. 1, wherein the ports 25 and 27 are in communication, so that the space 14 and interior of the conduit 15 may be at atmospheric pressure. Thus, the controlled valve will assume a position corresponding to atmospheric pressure in the diaphragm motor. Upon air being admitted to the chamber 12 at a normal operating pressure it will tend to force the piston 21 toward the upper limit of its excursion. With the flapper 47 in the position shown in Figure 1 escape of air through the orifice 42 will be inhibited, with the consequence that air flowing through the passage 40 and entering the cavity above the piston will build up a pressure in said cavity. This pressure will balance that exerted by air in the chamber 12 upon the lower end of the piston; and, these pressures being balanced, the influence of the spring 41 will maintain the piston member 21 in the position shown in Fig. 1, so that the interior of the conduit 15 and the diaphragm motor of the valve 16 will remain at atmospheric pressure.

It may now be assumed that there is applied to the vane or flapper 47, either manually or otherwise, a mechanical force sufficient to overcome the influence of the spring 50 and displace the flapper 47 an appreciable distance from the tip of the nozzle 33, thereby opening the orifice 42 and allowing air to vent therethrough to the atmosphere. Pressure within the cavity between the upper end of the piston and the base of the nozzle will then tend to fall and will be governed by the relative resistance to flow of air through the tube 40 and the orifice 42. By design, this relationship is made such that the escape of air through the orifice 42 can take place faster than its admission through the tube 40, so that the pressure above the piston will drop to a value near atmospheric, whereupon the supply pressure in the chamber 12 will overcome the force of the spring 41, and the piston 21 will be moved to the upper extremity of its excursion, as indicated in Figure 2. Under this condition the portion 36 of the piston will interrupt communications between the space 14 and the atmosphere, and air will be admitted directly from the chamber 12 to the conduit 15 and thereby to the diaphragm motor of the valve 16 to operate the same. There has thus been provided pneumatic relay means whereby the operation of a fluid-pressure-actuated valve may be positively directed with a negligible expenditure of energy at the primary control point.

In Fig. 3 is shown means whereby actuation of a relay valve embodying the principle of the invention may be effected from a point at some distance from the location of said valve. The nozzle 33 of Figs. 1 and 2 is replaced by an extended conduit or pipe 55 adapted to be inserted in place of said nozzle into the threaded opening in the cap 30, and terminating in an orifice position 56. As shown in Fig. 3 a movable vane, or flapper 57 is juxtaposed to the orifice portion 56 more or less to obstruct the escape of air therefrom according to its position with respect to said orifice, as deflected through a small angle $a$. It will be seen that the performance of the relay valve in response to changes in the position of the member 57 will differ from its performance in the form shown in Figs. 1 and 2, only to the extent that the resistance of the extended conduit 55 to air flow may somewhat slow its action. This characteristic may be compensated for by altering the relative proportions of the conduit 55, the orifice 56, and, if necessary, the tubular passage 40 providing a bypass between the ends of the piston 21.

Figs. 4 and 5 are respectively side and end elevations illustrating means alternative to the conventional flapper for regulating escape of air from the relay valve. Juxtaposed to the nozzle 56 is the flat face of a cam or similar barrier 60 angularly movable in a plane substantially perpendicular to the axis of the orifice and about the axis of a shaft or spindle 61. Said shaft or spindle may form a part of a control instrument such as a process cycle controller, and the shaft may be rotated intermittently or continuously according to the type of instrument. As shown in the drawing, the orifice is obstructed by the cam 60; and control is obtained either by having the cam formed with portions of different radii, as indicated at $b$, or also with one or more perforations, as indicated at $c$, whereby the degree of obstruction of the orifice, and hence the action of the relay valve, is made subject to the rotated position of the cam 60.

As a further alternative, there is shown in Fig. 6 the manner in which control may be obtained by direct association of the air vent with the edge of a cylindrical cam member. Juxtaposed to the orifice 56 is the face of a cam member 62 formed to two radii $r_1$ and $r_2$ of different values. The portion of the cam having the radius $r_1$ is made such that when juxtaposed to the orifice 56 the opening therein will be obstructed to a degree to prevent the escape of an appreciable volume of air therethrough, while with the lesser radius $r_2$ presented to the orifice there will be such clearance that the pressure within the orifice and connected parts will drop to an extent to render the associated relay valve operative.

While the alternative means for regulating the outflow of air have been shown as associated with the orifice 56 at the extremity of the conduit 55, it will be apparent that they may equally well be directly associated with, and juxtaposed to, the nozzle member 33 forming an integral part of the valve assembly. Other expedients, moreover, for alternatively preventing and permitting the escape of air from the relay valve to operate the same may be used without departing from the spirit of the invention.

Figure 7:
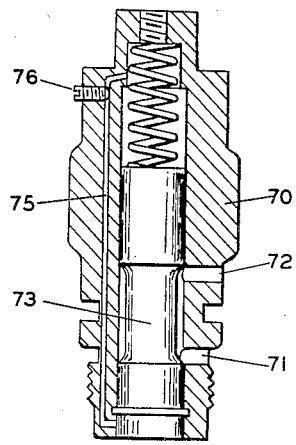
Fig. 7 is a sectional view of a form of the invention alternative to that shown in Figs. 1 and 2.

In Fig. 7 is shown a modified form of the relay valve assembly, differing principally from the previously shown form in the means for equalizing pressure upon the two extremities of the floating piston. A body portion 70 corresponds in principle, dimensions and details with the combination of body portion 20 and cap 30 shown in Figs. 1 and 2. Ports 71 and 72 correspond in location and disposition to the ports 25 and 27 of the previously described form. In Fig. 7 said ports are shown on only one side of the valve body, but it is understood that there may be a plurality of such ports extending radially and circumferentially disposed about the structure. Internally formed in the body 70 is a cylindrical bore adapted to receive a floating piston 73 similar to the piston 21 of the previously described form but lacking the central constricted passage or capillary tube 40. The piston 73 is limited in its excursion in a manner identical with that in Figs. 1 and 2; but, if necessary, the piston may be made slightly shorter, allowing the retaining ring at its bottom end to be positioned somewhat higher, whereby to provide a permanently clear space below the piston. Formed within the body portion 70 is a longitudinal passage 75 extending from the space below the piston to the uppermost part of the interior space in the body, whereby to provide communication between the two ends of the piston. The passage 75 is preferably of small bore, and may be provided with an adjustable screw 76 comprising the equivalent of a needle valve, whereby to modify the rate of air flow through said passage in accordance with operating requirements. The operation of the valve shown in Fig. 7 will obviously be identical to that of the previously described form, the only significant difference lying in the fact that, the bypass 75 being in the stationary part of the valve, and controllable by the screw 76, the response characteristic of the device may readily be adjusted at any time and without dismantling the assembly.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A relay valve for use in conjunction with shiftable means to control the flow of a relatively large volume of fluid from a source to a conduit by modifying the escape of a relatively small volume of said fluid from said source to the atmosphere, said valve comprising a body having therein an opening including a portion at one end thereof adapted for free communication with said source and another portion at the other end thereof communicating solely and restrictedly with the atmosphere through a relatively small orifice, said body also having spaced ports large compared to said orifice and adapted to communicate with said conduit and the atmosphere respectively, a piston adapted for limited movement in said opening and having one portion adapted for communication with said source and another portion defining a variable volume space between said piston and said orifice, said piston also having a portion thereof conformed to cooperate with said ports to provide free communication between said source and said conduit when said piston is at one position in its movement and to provide free communication between said conduit and the atmosphere when in another position in its movement, means forming a capillary bore providing restricted communication between said space and said source, said capillary bore being elongated and having an axial length many times its diameter, and spring means adapted to cooperate with the fluid pressure in said space for forcing said piston toward the last-named position when the pressure in said space is substantially equal to that of said pressure fluid.

2. A relay valve for use in conjunction with shiftable means to control the flow of a relatively large volume of pressure fluid from a source to a conduit by modifying the escape of a relatively small volume of said fluid from said source to the atmosphere, said valve comprising a body having therein a longitudinally extended opening freely communicating at one end of said body with said source and having its other end in restricted communication solely with the atmosphere through a relatively small orifice, said body also having lateral ports large compared to said orifice longitudinally spaced and adapted to communicate with said conduit and the atmosphere respectively, a piston adapted for limited translation in said opening and adapted at one end for communication with said source and the other end defining a variable volume space between said piston and said orifice, said piston also having a portion intermediate the ends thereof conformed to cooperate with said ports to provide free communication between said source and said conduit when said piston is at one limit of its translation and to provide free communication between said conduit and the atmosphere when at the other limit of its translation, means forming a capillary bore providing restricted communication between said space and said source, said capillary bore being elongated and having an axial length many times its diameter, and spring means adapted to cooperate with the fluid pressure in said space for forcing said piston towards the last-named limit of its translation when the pressure in said space is substantially that of said pressure fluid and equal to the pressure of said one end of said piston.

3. A relay valve for controlling the flow of a relatively large volume of fluid from a source to a conduit by modifying the escape of a relatively small volume of said fluid from said source to the atmosphere, said valve comprising a body having therein a longitudinally extended opening communicating at one end with said source and having its other end in restricted communication solely with the atmosphere through a relatively small orifice, said body also having lateral ports large compared to said orifice longitudinally spaced and adapted to communicate with said conduit and the atmosphere respectively, a piston adapted for limited translation in said opening and adapted at one end for communication with said source and the other end defining a variable volume space between said piston and said orifice, said piston also having its lateral surface conformed to cooperate with said ports to provide free communication between said source and said conduit when said piston is at one limit of its translation and to provide free communication between said conduit and the atmosphere when at the other limit of its translation, means forming a capillary base providing restricted communication between said space and said source, said capillary bore being elongated and having an axial length many times its diameter, shiftable means cooperating with said orifice to control the escape of fluid therethrough, and spring means adapted to cooperate with the fluid pressure in said space and at the source end of said piston for forcing said piston towards the last-named limit of its translation when said shiftable means closes said orifice.

4. A relay valve for controlling the flow of a relatively large volume of fluid from a source to a conduit by modifying the escape of a relatively small volume of said fluid from said source to the atmosphere, said valve comprising a body having therein an opening including a portion adapted for communication with said source and another portion communicating solely with the atmosphere through a restricted orifice, said body also having spaced ports large compared to said orifice and adapted to communicate with said conduit and the atmosphere respectively, a piston adapted for limited movement in said opening and having one portion adapted for communication with said source and another portion defining a variable volume space between said piston and said orifice, said piston also having a portion thereof conformed to cooperate with said ports to provide free communication between said source and said conduit when said piston is at one position in its movement and to provide free communication between said conduit and the atmosphere in another position in its movement, means forming a capillary bore providing restricted communication between said space and said source, said capillary bore being elongated and having an axial length many times its diameter for permitting fluid to pass therethrough at a lesser rate than fluid vents through said orifice, spring means acting upon said piston and urging the latter toward the last-named position in opposition to pressure from said source against the first-mentioned portion of said piston, movable means cooperating with said orifice for blocking flow of fluid therethrough and enabling pressure to build up from said communicating means in said space between said piston and said orifice whereby said spring means can shift said piston to said last-named position, said movable means being mounted for movement to a position for permitting venting of fluid through said orifice to atmosphere faster than fluid enters said space through said communicating means whereby pressure from said source can shift said piston to its first-named position against the action of said spring means.

5. A relay valve as defined by claim 1, wherein said capillary bore providing restricted communication between said space and said source comprises a passage in said piston.

6. A relay valve as defined by claim 1, wherein said capillary bore providing restricted communication between said space and said source comprises a passage in said body.

7. A relay valve as defined by claim 6 wherein means are provided for varying the restricting effect of said capillary bore.

8. A relay valve as defined by claim 2, wherein said capillary bore providing restricted communication between said space and said source comprises a passage extending in said piston from one end to the other end thereof.

9. A relay valve as defined by claim 2, wherein said capillary bore providing restricted communication between said space and said source comprises a passage in said body, said passage communicating at one end with said space and at the opposite end with the interior of said body beyond the end of said piston remote from said space.

10. A relay valve as defined by claim 3 wherein the shiftable means cooperating with said orifice comprises a pivoted element movable toward and away from said orifice.

11. A relay valve as defined by claim 10, wherein means integral with the valve body is provided for supporting said pivoted element.

12. A relay valve as defined by claim 3, wherein the shiftable means cooperating with said orifice comprises a cam movable with respect to said orifice.

13. A relay valve as defined by claim 12, wherein the face of said cam is movable across said orifice and comprises portions offering different resistances to the flow of fluid through said orifice.

14. A relay valve as defined by claim 12, wherein the cam has a peripheral edge movable across said orifice, said edge having portions of different radii for offering different resistances to the flow of fluid through said orifice.

15. A relay valve as defined by claim 1 wherein said capillary bore providing restricted communication between said space and said source has a diameter which is substantially less than the diameter of said orifice, thus providing greater impedance to the flow of fluid into said space than that offered by said orifice to the free venting of fluid from said space to the atmosphere.

References Cited in the file of this patent

UNITED STATES PATENTS

| | | | |
|---|---|---|---|
| 558,919 | Adams | Apr. 28, | 1896 |
| 643,906 | Marsh | Feb. 20, | 1900 |
| 1,035,516 | Ashley | Aug. 13, | 1912 |
| 1,977,559 | Lewis | Oct. 16, | 1934 |
| 2,261,827 | Brown | Nov. 4, | 1941 |
| 2,388,457 | Ziegler | Nov. 6, | 1945 |
| 2,543,120 | McLeod | Feb. 27, | 1951 |

FOREIGN PATENTS

| | | |
|---|---|---|
| 497,843 | Great Britain | of 1938 |